US009651949B2

(12) United States Patent
Young

(10) Patent No.: US 9,651,949 B2
(45) Date of Patent: *May 16, 2017

(54) APPARATUS FOR CLEANING LINES ON A PLAYING SURFACE AND ASSOCIATED METHODS, OTHER HANDLE ENHANCEMENTS

(71) Applicant: David Wright Young, Orlando, FL (US)

(72) Inventor: David Wright Young, Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/817,907

(22) Filed: Aug. 4, 2015

(65) Prior Publication Data

US 2015/0338851 A1 Nov. 26, 2015

Related U.S. Application Data

(63) Continuation of application No. 13/115,101, filed on May 24, 2011, now Pat. No. 9,128,487, which is a (Continued)

(51) Int. Cl.
*E01H 1/05* (2006.01)
*G05D 1/00* (2006.01)
*G05D 1/02* (2006.01)

(52) U.S. Cl.
CPC ......... *G05D 1/0088* (2013.01); *G05D 1/0242* (2013.01); *G05D 1/0272* (2013.01);
(Continued)

(58) Field of Classification Search
CPC .................. G05D 1/00; G05D 1/0088; G05D 2201/0203; G05D 1/0227; G05D 1/0259; A47L 1/02; A47L 2201/00
(Continued)

(56) References Cited

U.S. PATENT DOCUMENTS 1,263,198 A 4/1918 Brandt
3,642,087 A 2/1972 Sampey
(Continued)

FOREIGN PATENT DOCUMENTS

FR 2741583 A1 5/1997

OTHER PUBLICATIONS

Borenstein, J. et al., Navagating Mobile Robots Systems and Techniques, pp. 1-225, (1996) A. K. Peters, Ltd., Wellesley, MA.
(Continued)

*Primary Examiner* — Dalena Tran

(57) ABSTRACT

An apparatus and method for clearing a playing surface are provided. The apparatus preferably includes a chassis or frame, a sensor connected to the chassis to sense a location of a line on a playing surface that needs to be cleaned, a drive connected to the chassis to drive the chassis in a selected direction of travel, and a handle to facilitate handling by a user. The apparatus also preferably includes a controller connected to the chassis, in communication with the drive, and responsive to the sensor to control the drive to thereby direct the chassis to move along the line that needs to be cleaned in the selected direction of travel and a cleaning device connected to the chassis to clean the line with the chassis is being driven along the line. Associated software is provided as well.

11 Claims, 14 Drawing Sheets

Related U.S. Application Data continuation-in-part of application No. 11/810,418, filed on Jun. 5, 2007, now Pat. No. 7,957,859, which is a continuation-in-part of application No. 10/977,786, filed on Oct. 29, 2004, now Pat. No. 7,245,994, which is a continuation-in-part of application No. 10/226,978, filed on Aug. 23, 2002, now Pat. No. 6,847,868.

(60) Provisional application No. 60/314,933, filed on Aug. 24, 2001.

(52) U.S. Cl.
CPC .......... *G05D 1/028* (2013.01); *G05D 1/0227* (2013.01); *G05D 1/0255* (2013.01); *G05D 1/0259* (2013.01); *G05D 2201/0203* (2013.01)

(58) Field of Classification Search
USPC ............. 701/1, 23, 25, 28; 318/580, 568.11, 318/568.12; 901/1; 15/3, 303, 319, 313, 15/320, 49.1, 53.1, 306.1, 309, 48, 340.3, 15/21.1, 34
See application file for complete search history.

(56) References Cited

U.S. PATENT DOCUMENTS

| | | | |
|---|---|---|---|
| 3,935,922 A | 2/1976 | Cooper | |
| 3,970,840 A | 7/1976 | DeBruine | |
| 4,004,805 A | 1/1977 | Chen et al. | |
| 4,108,432 A | 8/1978 | Clark et al. | |
| 4,108,843 A | 8/1978 | Chen et al. | |
| 4,121,097 A | 10/1978 | English | |
| 4,129,920 A * | 12/1978 | Evans | A47L 5/32 15/337 |
| 4,138,762 A * | 2/1979 | Jost | A47L 9/0477 15/419 |
| 4,307,791 A | 12/1981 | DeBruine | |
| 4,674,048 A | 6/1987 | Okumura | |
| 4,694,153 A | 9/1987 | Bejczy | |
| 4,703,240 A | 10/1987 | Yoshimoto | |
| 4,711,316 A | 12/1987 | Katou | |
| 4,747,174 A | 5/1988 | Hightower | |
| 4,775,023 A | 10/1988 | Shimada | |
| 4,917,533 A | 4/1990 | Wilson | |
| 4,958,400 A | 9/1990 | Sugita | |
| 5,015,300 A | 5/1991 | Leers | |
| 5,032,775 A | 7/1991 | Mizuno et al. | |
| 5,066,854 A | 11/1991 | Meyer | |
| 5,109,566 A | 5/1992 | Kobayashi et al. | |
| 5,111,401 A | 5/1992 | Everett, Jr. et al. | |
| 5,125,654 A | 6/1992 | Bruno | |
| 5,218,732 A | 6/1993 | Pettigrew et al. | |
| 5,241,724 A * | 9/1993 | Lim | A47L 9/045 15/321 |
| 5,279,672 A | 1/1994 | Belker et al. | |
| 5,293,955 A | 3/1994 | Lee | |
| 5,341,540 A | 8/1994 | Soupert et al. | |
| 5,376,783 A | 12/1994 | Vecht | |
| 5,377,106 A | 12/1994 | Drunk et al. | |
| 5,440,216 A | 8/1995 | Kim | |
| 5,525,884 A | 6/1996 | Sugiura et al. | |
| 5,534,762 A | 7/1996 | Kim | |
| 5,561,883 A | 10/1996 | Landry et al. | |
| 5,622,236 A | 4/1997 | Azumi | |
| 5,705,807 A | 1/1998 | Throngnumchai | |
| 5,764,060 A | 6/1998 | Gonzalez et al. | |
| 6,088,644 A | 7/2000 | Brandt et al. | |
| 6,112,143 A | 8/2000 | Allen et al. | |
| 6,419,599 B1 | 7/2002 | Kite | |
| 6,601,265 B1 | 8/2003 | Burlington | |

OTHER PUBLICATIONS

Jones, J. et. al. Mobile Robots Inspiration to Implementation, 2nd Edition, pp. 1-457, (1999) A. K. Peters, Ltd., Natick, Massachusetts.

Hollier, R. H., "A Comparative Evaluation of AGU Navigation Techniques", Automated Guided Vehicle Systems, pp. 65-77, (1987) Springer-Verlag, New York, New York.

Print advertisement, "The latest self-contained pool cleaner scrubs harder and works faster than its predecessors", Frontgate, p. 27 (Summer 1998).

Print advertisement, Robotic Lawnmower, Friendly Robotics, www.radioshack.com (Apr. 2001).

\* cited by examiner

APPARATUS FOR CLEANING LINES ON A PLAYING SURFACE AND ASSOCIATED METHODS, OTHER HANDLE ENHANCEMENTS

CROSS-REFERENCE TO RELATED APPLICATIONS

This application is a continuation of prior nonprovisional patent application U.S. Ser. No. 13/115,101, filed May 24, 2011, and titled "Apparatus For Cleaning Lines On A Playing Surface And Associated Methods, Handle Enhancements", which is a continuation-in-part of prior nonprovisional patent application U.S. Ser. No. 11/810,418, filed Jun. 5, 2007, and titled "Methods For Cleaning Lines On A Game Playing Surface", which is a continuation-in-part of prior nonprovisional patent application U.S. Ser. No. 10/977,786, filed Oct. 29, 2004, and titled "Apparatus For Cleaning Lines On A Playing Surface And Associated Methods, Enhancements", which is a continuation-in-part of prior nonprovisional patent application U.S. Ser. No. 10/226,978, filed Aug. 23, 2002, and titled "Apparatus For Cleaning Lines On A Playing Surface And Associated Methods", which claims the benefit of prior provisional patent application U.S. Ser. No. 60/314,933, filed Aug. 24, 2001, and titled "Automatic Propulsion, Navigation and Control of Cleaning Device for Tennis Court Lines", which are incorporated herein by reference in their entirety.

BACKGROUND OF THE INVENTION

1. Field of the Invention

The present invention relates to the surface maintenance and treatment industries in general and, in particular, to an apparatus and methods for cleaning lines on a playing surface.

2. Description of the Related Art

A tennis court is a flat surface defined by multiple boundary lines, namely, sidelines, baselines, service lines, and center lines. The double's sidelines, single's sidelines and baselines define the back courts. The single's sidelines and service lines define the service courts. The center lines divide the service courts. For a hard court, the above-mentioned boundary lines are typically drawn beforehand on a sheet of plastic pasted over a concrete base. For a clay or lawn court, the above-mentioned boundary lines are typically prepared by fixing white tape on a playing surface via tacks.

In general, a clay-surface tennis court or clay court requires daily maintenance in the form of smoothing and watering. The smoothing process is typically performed by dragging a broom or brush across the entire surface of the clay court for smoothing out the loose material on the surface of the clay court. After the smoothing process, the boundary lines on the clay court are usually covered with clay dust. As such, the boundary lines must be cleared of the clay dust before watering and/or before any serious play can be conducted on the clay court. Also, after several games have been played on the clay court, the boundary lines may again be covered by clay dust that necessitates cleaning Commonly, the cleaning is performed by a person walking a roller brush over all the lines of the clay court, which is very laborious and time-consuming, not to mention tiresome. An example of such a roller brush can be seen in U.S. Pat. No. 4,958,400 by Sugita titled "Line Cleaning Apparatus." Consequently, it is desirable to provide an apparatus for enhancing the cleaning of boundary lines on a playing surface such as a tennis court.

SUMMARY OF THE INVENTION

The present invention advantageously provides an apparatus and methods for enhancing the cleaning of boundary lines on a playing surface which substantially reduces or eliminates the manual labor involved in caring for the playing surface. The present invention also advantageously provides a cleaning apparatus and methods that reduce the time involved in caring for a playing surface. The present invention additionally advantageously provides a cleaning apparatus and methods that sense the presence of a boundary line that needs to be cleaned and directs the cleaning of the line without the need for any substantial manual labor. The present invention still also advantageously provides a cleaning apparatus and methods having familiarity or dimensions of a playing surface, such as a clay-surface tennis court, stored in memory, and directs the cleaning of the boundary lines of the tennis court by sensing the presence of or a location of the boundary lines.

More particularly, the present invention provides an apparatus for cleaning boundary lines on a playing surface which has a cleaning device, a drive positioned to drive the cleaning device along at least one boundary line of a playing surface, and a controller in communication with the drive and the cleaning device to selectively control the driving of the cleaning device to clean the at least one boundary line on the playing surface when the drive is driving the cleaning device along the at least one boundary line.

The present invention also provides an apparatus for cleaning lines on a game playing surface which has a chassis, sensing means connected to the chassis for sensing a location of a line associated with a game playing surface that needs to be cleaned, driving means connected to the chassis for driving the chassis in a selected direction of travel, controlling means connected to the chassis, in communication with the driving means, and responsive to the sensing means for controlling the driving means to thereby direct the chassis to be driven along the line that needs to be cleaned in the selected direction of travel, a cleaning device connected to the chassis to clean the line when the chassis is being driven along the line, and a handle to facilitate handling of the apparatus by a user.

The present invention also provides methods of cleaning boundary lines on a playing surface. A method for cleaning boundary lines on a playing surface preferably includes positioning a cleaning device on or near a game playing surface, directing a cleaning device to move along boundary lines on a playing surface responsive to a set of programmed directions, and cleaning the boundary lines when the cleaning device is moving along the boundary lines.

Another method for cleaning boundary lines on a game playing surface preferably includes directing a cleaning device to move along boundary lines on a game playing surface responsive to a set of programmed directions, and selectively positioning a cleaning tool on a boundary line to clean the boundary line as the cleaning device is moving over the boundary line.

Yet another method for cleaning boundary lines on a game playing surface, which has a first playing surface and a second playing surface separated from each other by a net connected between a plurality of posts, preferably includes directing a cleaning device to move along boundary lines on the first playing surface responsive to a set of programmed directions, cleaning the boundary lines on the first playing surface as the cleaning device is moving over the boundary lines on the first playing surface, directing the cleaning device to move around one of the net posts to position the cleaning device on the second playing surface, and cleaning the boundary lines on the second playing surface as the cleaning device is moving over the boundary lines on the second playing surface.

The present invention further provides a computer program product residing on a computer usable medium for directing a cleaning device to clean at least one line on a surface. A computer program product preferably includes program code means for directing a cleaning device to move along at least one line of a surface and program code means for cleaning the at least one line on the surface when the cleaning device is moving along the at least one line.

Another computer program product for cleaning boundary lines on a game playing surface is provided according to the present invention. The computer program product includes program code means for directing a cleaning device to move along boundary lines on a game playing surface responsive to a set of programmed directions and program code means for selectively positioning a cleaning tool on a boundary line to clean the boundary line as the cleaning device is moving over the boundary line.

Another computer program product for cleaning boundary lines on a game playing surface, which includes a first playing surface and a second playing surface separated from each other by a net connected between a plurality of net posts, is also provided. The computer program product includes program code means for directing a cleaning device to move along boundary lines on the first playing surface responsive to a set of programmed directions, program code means for cleaning the boundary lines on the first playing surface as the cleaning device is moving over the boundary lines on the first playing surface, program code means for directing the cleaning device to move around one of the net posts to position the cleaning device on the second playing surface, and program code means for cleaning the boundary lines on the second playing surface as the cleaning device is moving over the boundary lines on the second playing surface.

Accordingly, the present invention advantageously provides a cleaning apparatus and methods which selectively operate a cleaning device when the location or presence of a boundary line is sensed or when the cleaning apparatus determines that a boundary line needs to be cleaned. The present invention further advantageously provides software to enhance the cleaning of a surface such as boundary lines on a tennis court or other selected surface.

BRIEF DESCRIPTION OF THE DRAWINGS

Some of the features and advantages of the present invention having been stated, others will become apparent as the description proceeds when taken in conjunction with the accompanying drawings, in which.

DETAILED DESCRIPTION

The present invention will now be described more fully with reference to the accompanying drawings. The present invention, however, may be embodied in many different forms and should not be construed as limited to the illustrated embodiments set forth herein. Rather, such embodiments are provided so that the present disclosure will be thorough and complete, and will fully convey the scope of the present invention to those skilled in the art. Like numbers refer to like elements throughout, incremental hundred numbers, if used, indicate similar elements in alternative embodiments.

Figure 1:
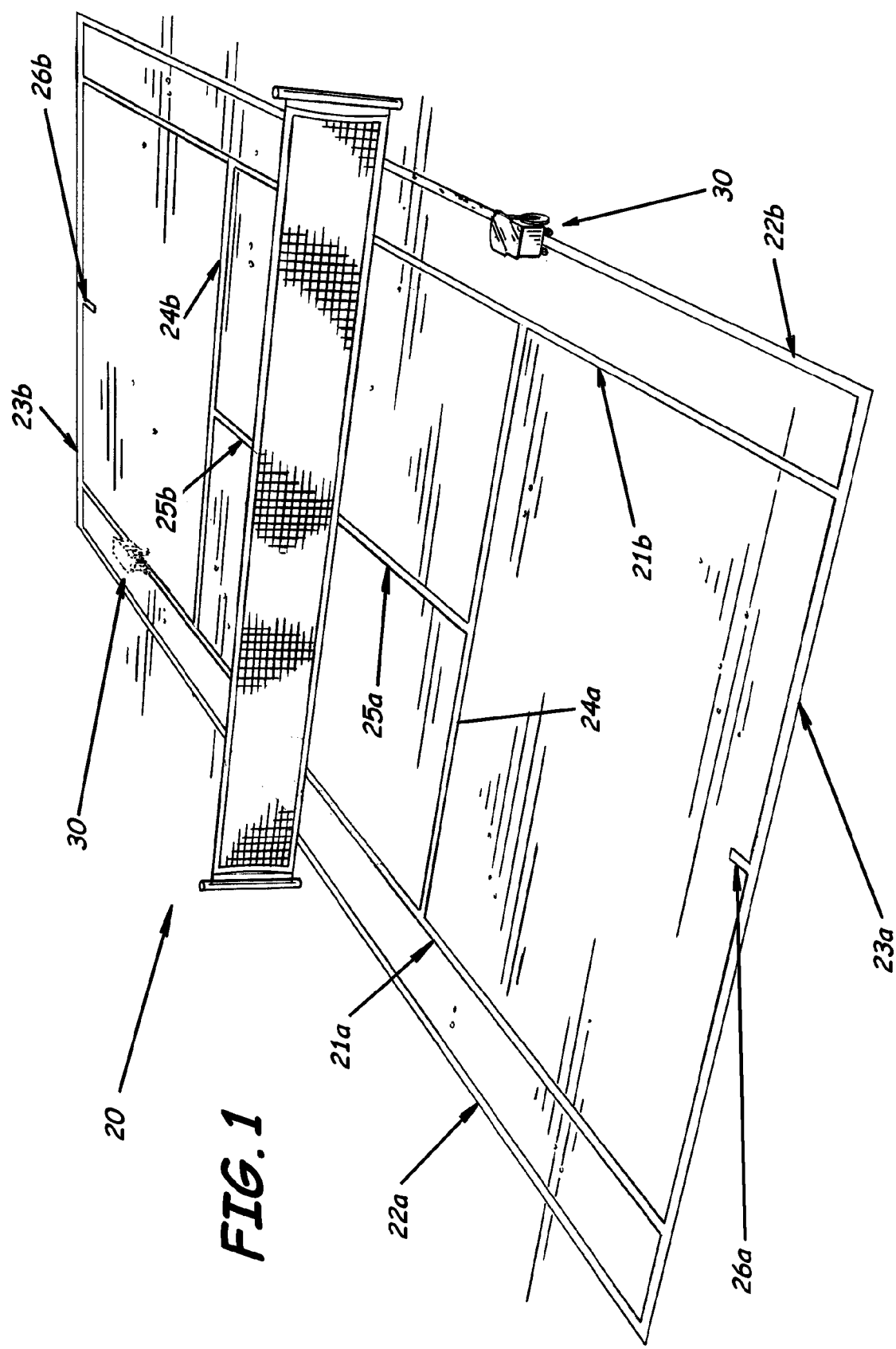
FIG. 1 is an environmental view of a cleaning apparatus being used for cleaning lines on the playing surface of a tennis court according to an embodiment of the present invention.

FIG. 1 illustrates a cleaning apparatus 30 cleaning boundary lines on a surface such as a tennis court 20 in accordance with an embodiment of the present invention. As shown, a tennis court 20 is a flat surface defined by single's sidelines 21a-21b, double's sidelines 22a-22b, baselines 23a-23b, service lines 24a-24b, and center lines 25a-25b. The single's sidelines 21a-21b, the double's sidelines 22a-22b and the baselines 23a-23b define the back courts. The single's sidelines 21a-21b and the service lines 24a-24b define the service courts. The center lines 25a-25b divide the service courts. The baselines 23a and 23b include center marks 26a and 26b, respectively. The size of a standard single's court is defined as 27 feet by 78 feet, and the size of a standard double's court is defined as 36 feet by 78 feet. The size of a standard service court is defined as 27 feet by 42 feet. As depicted in FIG. 1, a cleaning apparatus 30 for cleaning boundary lines on the tennis court 20 is shown to be cleaning the double's sideline 22b. Preferably, the tennis court 20 has a clay or fast dry surface, or any of the other variety of clay-like surfaces sometimes referred to as "clay" or "soft," including those that may be referred to by their trademarked or brand names such as Har-Tru or Fast-Dri, and require routine maintenance that generally involves smoothing and sweeping the surface and brushing the lines.

FIGS. 2-9 illustrate a cleaning apparatus 30, in accordance with three different embodiments of the present invention. As shown, the cleaning apparatus 30, 130, 230 includes a main frame or chassis 35, 135, 235 sensing means, such as provided by a line-sensing module 31, 131, 231, connected to the chassis 35, 135, 235 for sensing a location or presence of a line associated with a surface or a game playing surface that needs to be cleaned, driving means, such as provided by a propulsion or drive module 33, connected to the chassis 35, 135, 235 for driving the chassis in a selected direction of travel, controlling means, such as provided by a navigation and control module 32, connected to the chassis 35, 135, 235, in communication with the driving means, and responsive to the sensing means for controlling the driving means to thereby direct the chassis to be driven along the line that needs to be cleaned in the selected direction of travel, and a cleaning device 34, 134, 234 connected to the chassis 35, 135, 235 to clean the line when the chassis 35, 135, 235 is being driven along the line, and a handle 39, 139, 239 to facilitate handling of the apparatus by a user. The line-sensing module 31 senses various landmarks (such as lines of specific lengths, net posts, line boundaries) on the tennis court 20 via a sensing device such as a sonar, a radio frequency sensor, a transducer, a camera, a charge coupled device, photo-optical sensors, radar, a laser or by contact. The design, position and orientation of the line-sensing module 31 preferably allow landmarks that are far away from or in close proximity with the cleaning apparatus 30, 130, 230 to be sensed. The sense data information obtained by the line-sensing module 31 is communicated to the navigation and control module 32 for the purpose of navigating the movement of the cleaning apparatus 30, 130, 230. After receiving the sense data information from the line-sensing module 31, the navigation and control module 32 determines the position of the cleaning apparatus 30 in relation to the detected landmark on the tennis court 20, and then controls the propulsion module or drive 33 to move to and along a specific boundary line on the tennis court 20. The sensing device is preferably positioned at an elevation higher than the game playing surface and is preferably oriented to capture an image or data in a direction transverse to the game playing surface. The propulsion or drive module 33 includes an energy supply such as a battery or a fuel cell and an appropriate motor (not shown) for driving wheels, treads, rollers, or other devices to assist travel along a surface. In the present embodiment, movements of the cleaning apparatus 30 are assisted by a pair of drive wheels 36 and a swivel wheel 37. The cleaning device 34 is also activated and deactivated as appropriate to clean a boundary line on the tennis court 20 when the cleaning apparatus 30 is moving along the boundary line. The cleaning device 34 can be a brush, a bristle, an air blower, or other cleaning or surface treatment tool as understood by those skilled in the art. The navigation and control module 32 can activate the cleaning device 34 for cleaning when the cleaning device 34 is positioned over a portion of the boundary line that needs to be cleaned, or can deactivate the cleaning device 34 otherwise. The exercise of such control over the cleaning device 34 can conserve energy and can minimize the disturbance to the court surface outside of boundary lines.

Figure 10:
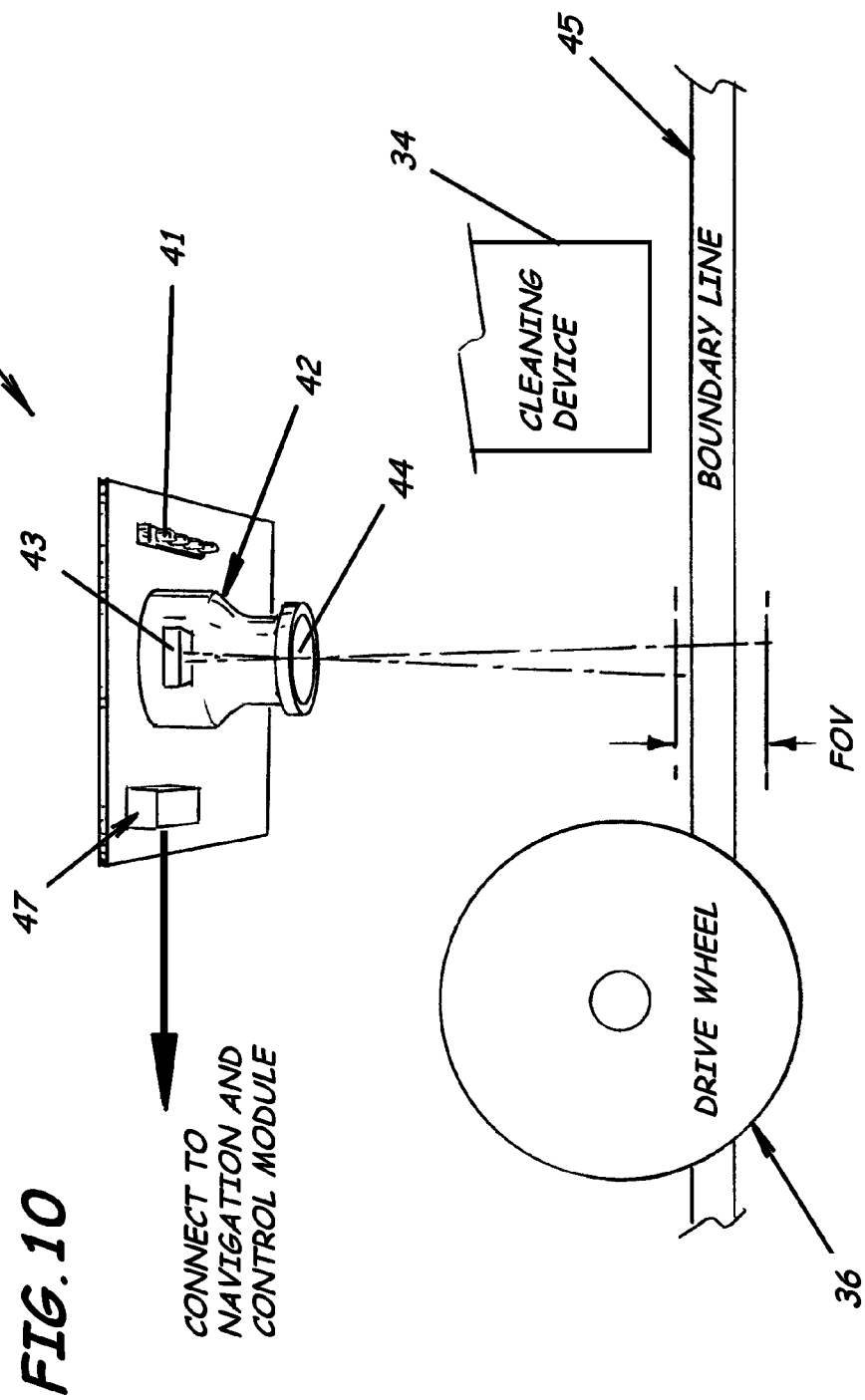
FIG. 10 is a schematic diagram of a line-sensing module within a cleaning apparatus according to an embodiment of the present invention.

FIG. 10 illustrates a line-sensing module 31, in accordance with an embodiment of the present invention. As shown, line-sensing module 31 includes a plurality of or an array of emitters such as infrared or IR emitters 41 and a sensing device 42, e.g., an optical sensing device or camera, having a sensor 43 and at least one lens 44 positioned to help focus light onto the sensor 43. Alternative, for example, the infrared emitters 41, can be light emitting diodes (LEDs) as understood by those skilled in the art. The sensing device 42 is positioned for viewing or sensing in a direction transverse to the court surface with its field of view (FOV) centered at a point in the court area where a boundary line, such as a boundary line 45, is located when the cleaning apparatus 30 is being driven along (and optionally cleaning or treating) the boundary line. As shown, for example, the FOV of the sensing device 42 can be perpendicular to the direction of the boundary line 45 and the FOV of the sensing device 42 can be slightly greater than the maximum width of the boundary line 45. The array of emitters 41 illuminates the court area for the camera 42. The purpose of the array of emitters 41 is to always provide a sufficient illumination for the optical sensing device 42, independent of the ambient lighting conditions in which the cleaning apparatus 30 are being operated. The sensing device also preferably includes a sensor interface positioned to serially shift out the captured image defined as a plurality of pixels as understood by those skilled in the art. A brightness level of each pixel, for example, can be represented by or correspond to at least one voltage signal received over a controlled period of time as also understood by those skilled in the art.

Figure 2:
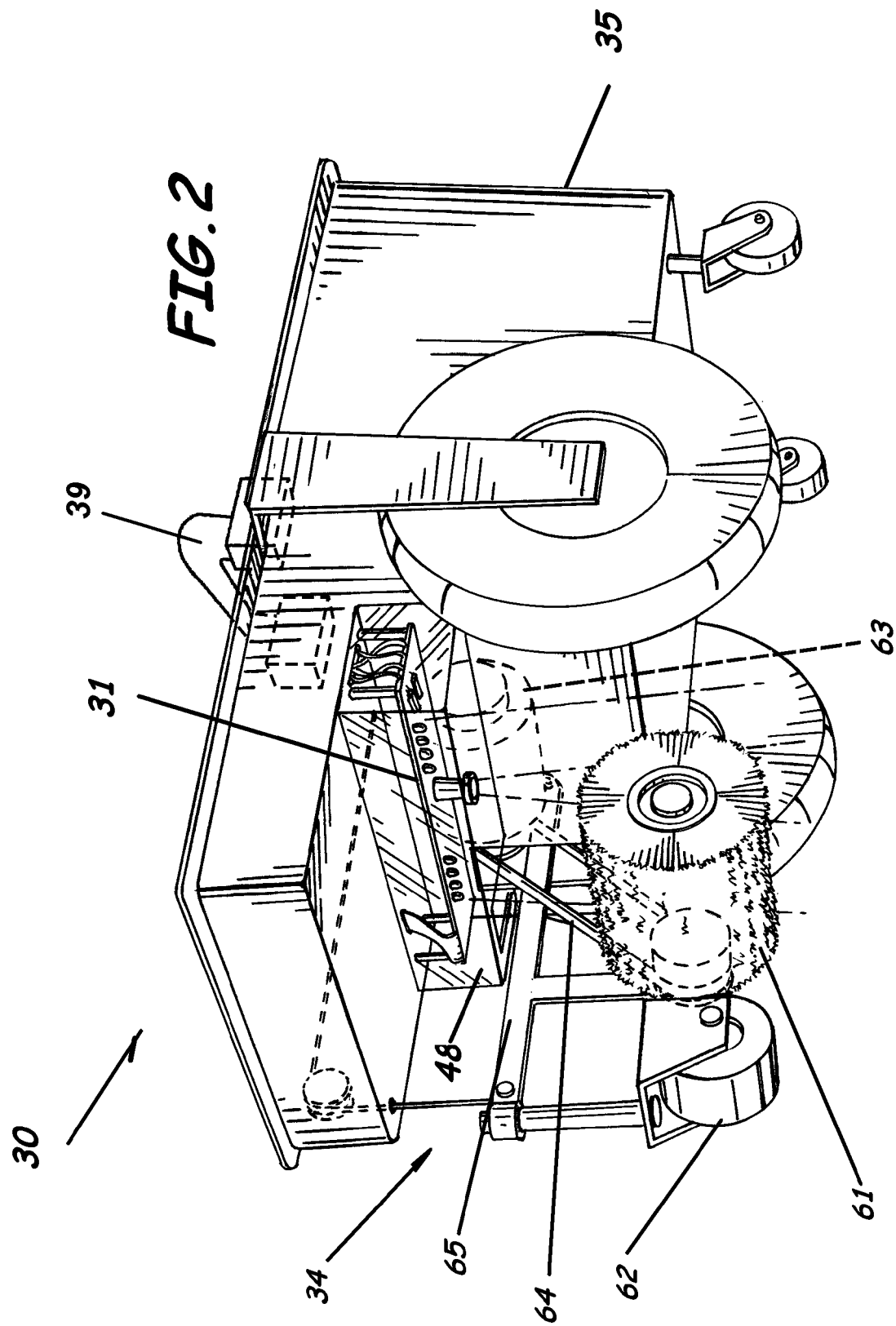
FIG. 2 is a perspective view of a cleaning apparatus according to an embodiment of FIG. 1 of the present invention.
Figure 3:
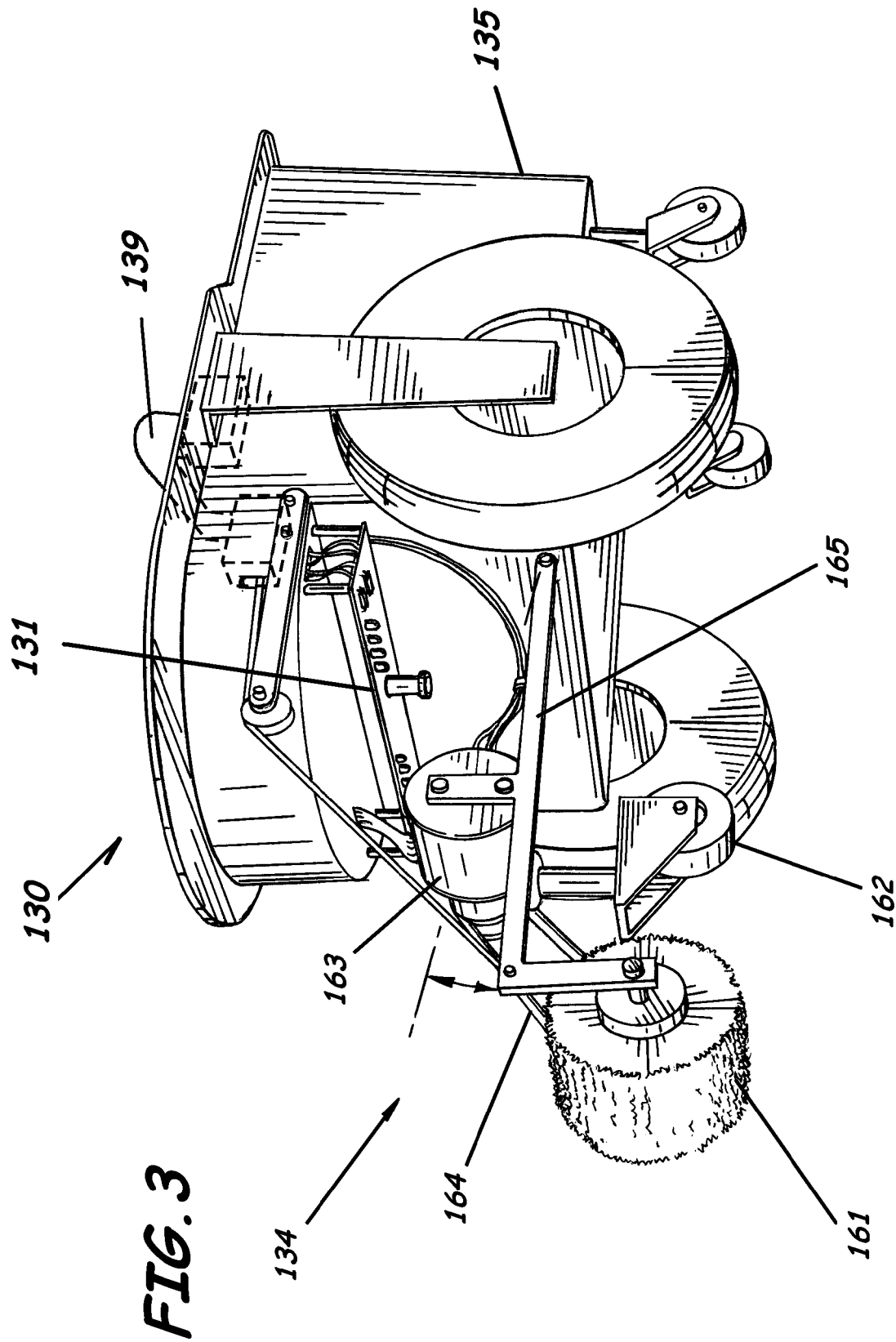
FIG. 3 is a perspective view of a cleaning apparatus according to another embodiment of the present invention.
Figure 4:
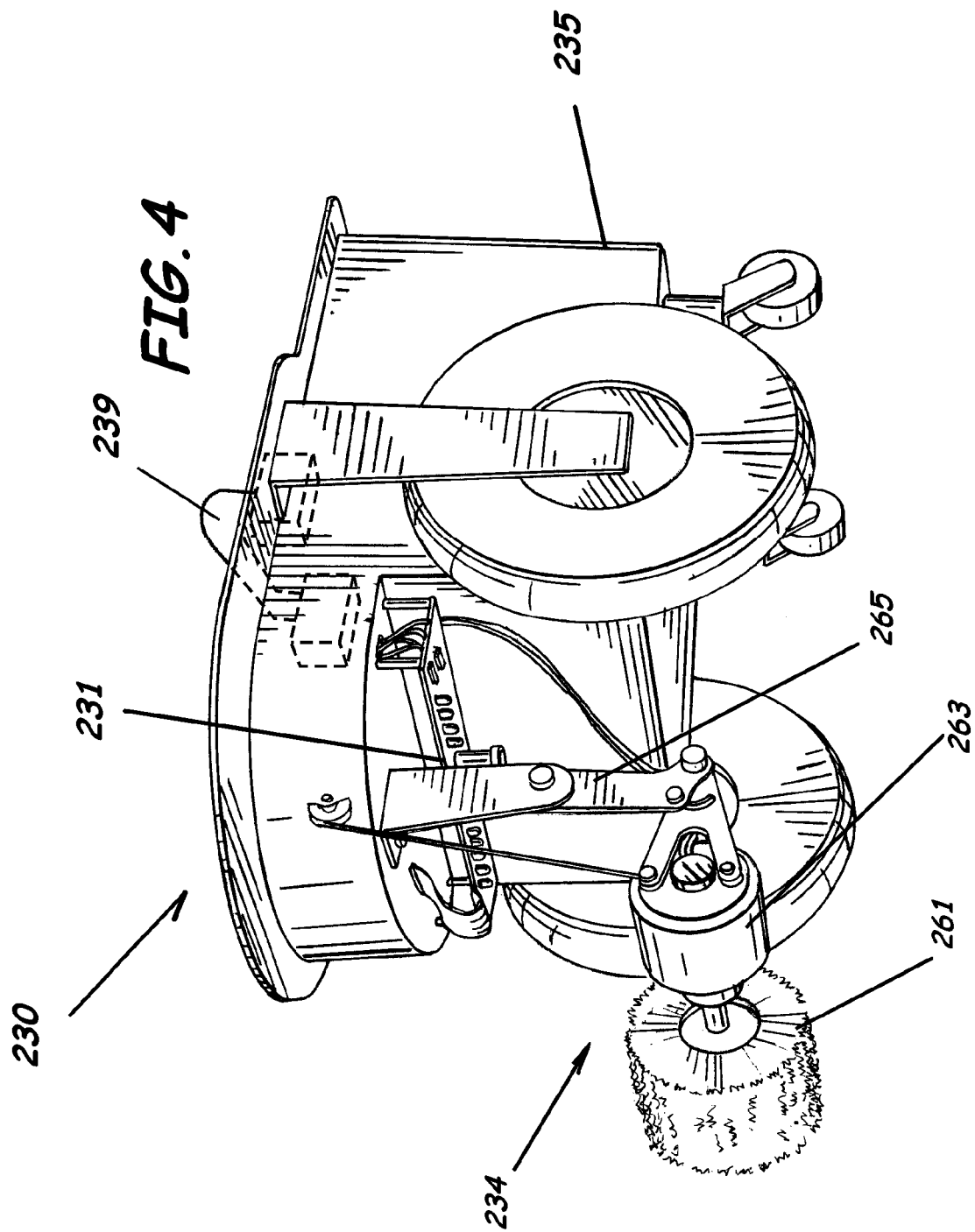
FIG. 4 is a perspective view of a cleaning apparatus according to yet another embodiment of the present invention.
Figure 5:
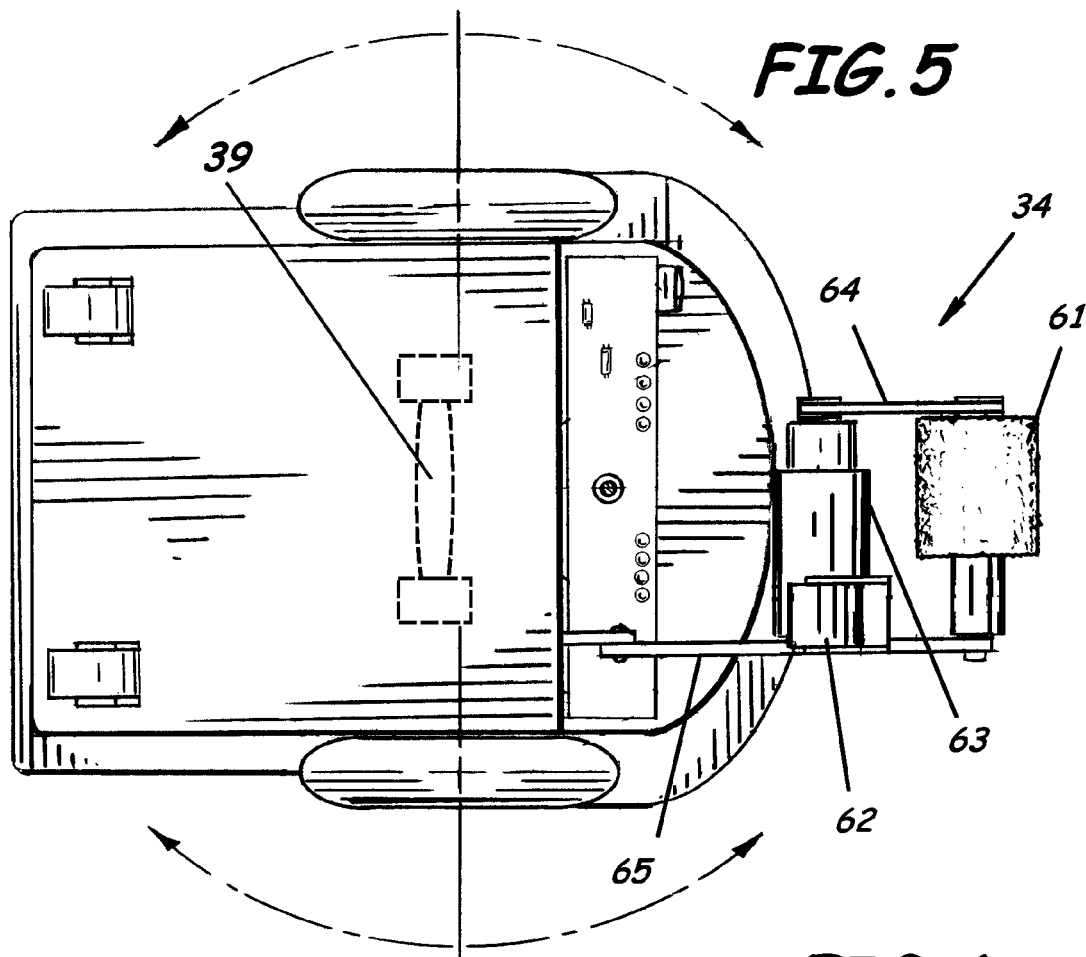
FIG. 5 is a bottom plan view of a cleaning apparatus according to the embodiment of FIG. 3 of the present invention.
Figure 6:
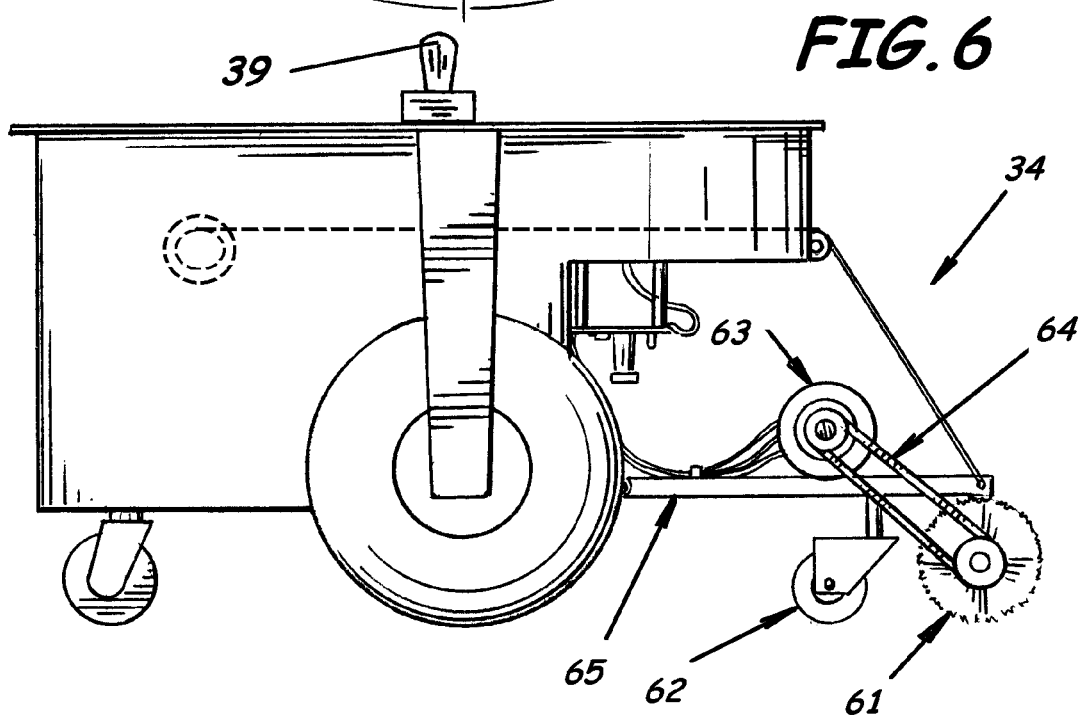
FIG. 6 is a side elevational view of a cleaning apparatus according to the embodiment of FIG. 3 of the present invention.
Figure 7:
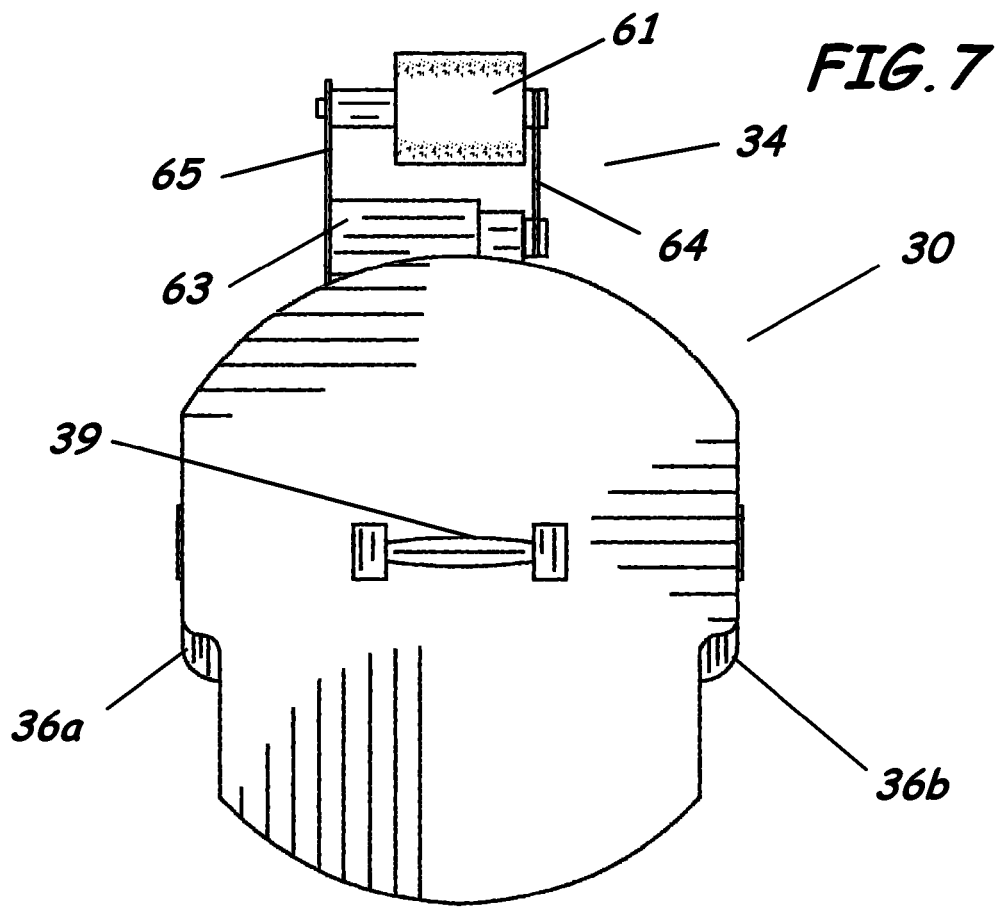
FIG. 7 is a top plan view of a cleaning apparatus according to the embodiment of FIG. 3 of the present invention.
Figure 8:
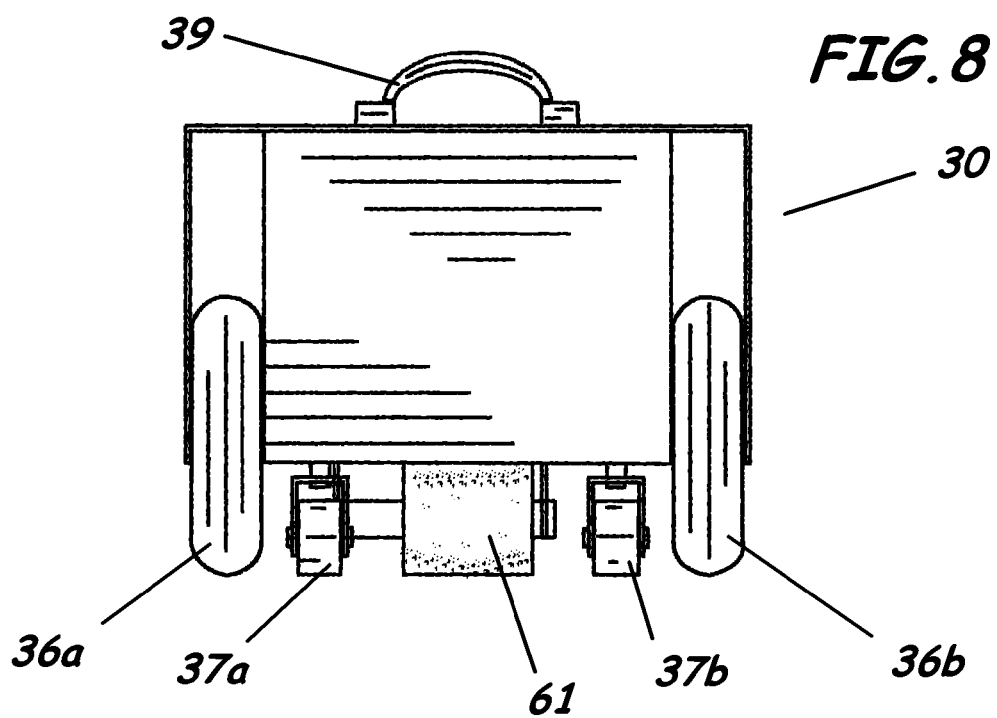
FIG. 8 is a rear elevational view of a cleaning apparatus according to the embodiment of FIG. 3 of the present invention.
Figure 9:
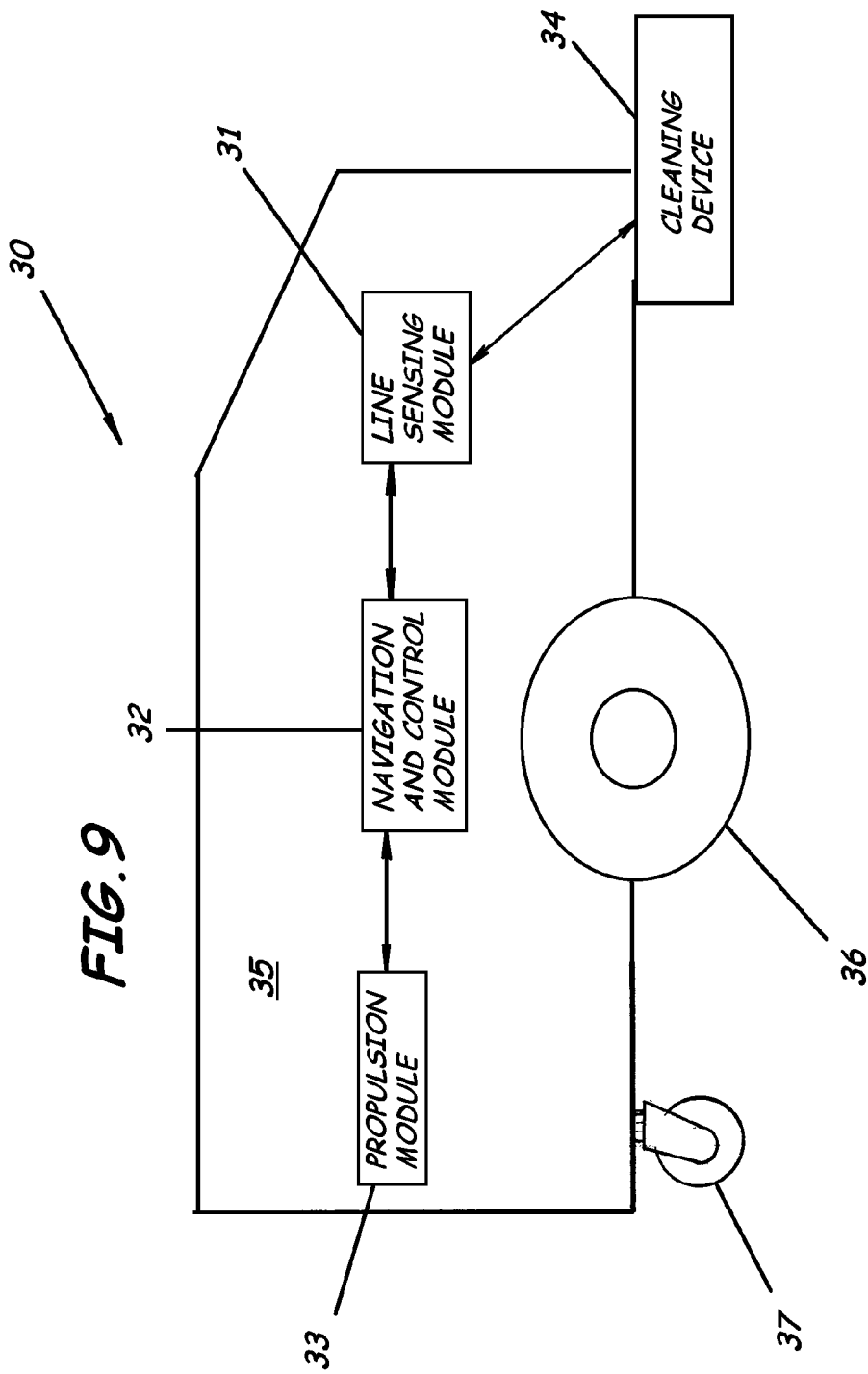
FIG. 9 is a block diagram of a cleaning apparatus according to an embodiment of the present invention.

As illustrated in FIG. 2, preferably, the line-sensing module 31 is enclosed within a shroud 48. The shroud 48 can be an opaque cover, e.g., formed of a plastic material, for protecting the sensing device 42 and other vision aspects from ambient light and/or other light impact. Although an embodiment of the sensing device 42 is optical in nature, it is understood by those skilled in the art that the sensing device 42 can be implemented by acoustical sensing device, an electro-magnetic or a magnetic sensing device, radio frequency sensing device, a contact sensor and any other through-the-air or contact sensors.

As perhaps best shown in FIG. 10, an image of the boundary line 45 is directed to the sensor 43 by the lens 44. The sensor 43 is an integrated circuit containing a set of sensor elements positioned in a single line. The linear array of sensor elements captures the image received through the lens 44. The sensor 43 then serially shifts out the captured image in analog form with the relative voltage of each pixel representing the relative illumination the pixel received over a controlled period of time, i.e., the image integration time. Thus, the sensor 43 captures and sources an analog pixel stream that is in the form of a one-dimensional (linear) image. The line-sensing module 31 can also include a microcontroller (or a microprocessor) 47 to control the integration time of the sensor 43 and to control the shifting of the analog image coming out of the sensor 43. The microcontroller 47 converts the analog image to a digital image for further processing.

The purpose of the line-sensing module 31 is to determine the lateral displacement of the cleaning apparatus 30 from a boundary line that is being followed. In order to perform such function, the cleaning apparatus 30 has to be able to process the image captured by the line-sensing module 31 and then determines if the boundary line is present, and the position or location of the boundary line in the FOV of the camera 42 if the boundary line is present. The characteristic of a boundary line that allows it to be distinguished from the court surface is the fact that the boundary line is more reflective of the irradiance received than the court surface. With the digital image, the microcontroller 47 can analyze the information in the digital image via a variety of image processing techniques, such as FOV attenuation adjustment as will be understood by those skilled in the art. Successive images are continuously captured and analyzed so that the present lateral position of the cleaning apparatus 30 with respect to a boundary line being followed can always be known.

If an area on the tennis court 20 that is being sensed is one over which the cleaning apparatus 30 has already passed, then the boundary lines in that area should be free from loose materials. This fact supports more fidelity in determining whether a sensed area is on the boundary line or not and in fact should allow the line-sensing module 31 to operate correctly even for boundary lines that are completely covered over when cleaning begins. For this reason, the line-sensing module 31 is preferably positioned downstream from the cleaning device 34 (along the direction of travel).

Given a known initial position and orientation on the tennis court 20, the cleaning apparatus 30 can determine its current position by factoring in its change in position. The change in position can be calculated by odometric techniques that involve the continuous measurement of dynamic parameters such as wheel rotations and incorporate static parameters such as wheel diameter (or track dimensions). The odometric technique of position determination, however, typically accumulates errors, and the errors need to be corrected when the cleaning apparatus 30 reaches various court landmarks (which can be sensed based on knowledge of the fixed court geometry and knowledge of the approximate position of the cleaning apparatus 30) such as line intersections at corners and tees (e.g., the intersection of the double's sideline 22b and the baseline 23a and the intersection of the service line 24a and the single's sideline 21b, respectively).

At the ends of boundary lines and when traveling between boundary lines, it is sometimes necessary to steer the cleaning device 34 off any boundary line. The navigation and control module 32 includes a line determiner (not shown) positioned to determine whether a boundary line is present based on the captured image from the line-sensing module 31. This is accomplished in software, for example. The processing of the images that are captured by the vision system results in a determination of the presence or absence of the line in the camera FOV. This information is communicated to the navigation and control module 32. When the cleaning device 34 is not over the boundary line, the navigation and control module 32 turns the cleaning device 34 off and retracts the cleaning device 34 to avoid disturbing the portions of the tennis court 20 that do not have a boundary line. The boundary lines of the portion of the tennis court 20 on one side of the net can be traversed and cleaned in a fixed order that is programmed into the navigation and control module 32. When those boundary lines are completed, that side of the tennis court 20 is known to be finished. The navigation and control module 32 knows its position when it finishes one side of the tennis court 20. By utilizing a position analyzer (not shown), the navigation and control module 32 knows the relative position of any point across the net on the other side of the tennis court 20 (based on the fixed standard court geometry). The position of the apparatus is known. The point at which cleaning is to begin on the other side of the net is also known. The fixed standard court geometry then defines the relative position of the two points. This information can define a preprogrammed maneuver for moving from the final position on the first half court to the desired starting position on the second half court. This maneuver can be preprogrammed based on the relative position of two points of interest, i.e., final point on the first half court and the starting point on the second half court, respectively. Such information can be used to navigate to any desired point on the other side of the tennis court 20 based on the above-mentioned odometric positioning techniques, and then by turning on the cleaning device 34 in the proximity (the exact position may not be known because of accumulated error) of a boundary line to allow visible detection of the boundary line and thereby its accumulated position error. Such known position can be the same relative position as the position at which the cleaning apparatus 30 started cleaning on the first side of the tennis court 20. In the present embodiment, the line-cleaning algorithm used on one side of the tennis court 20 is simply repeated on the other side of the tennis court 20.

Figure 11:
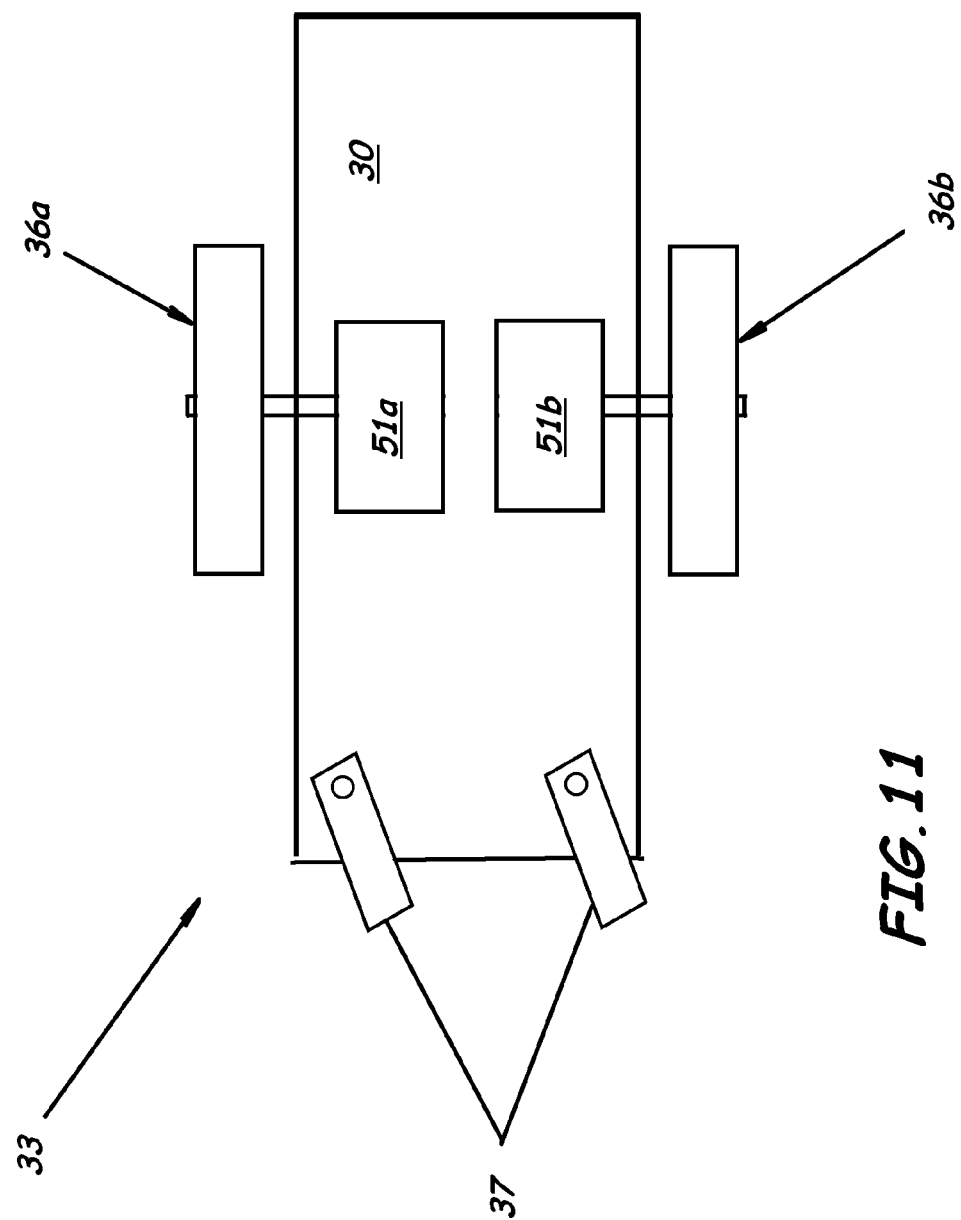
FIG. 11 is a schematic diagram of a propulsion module within the cleaning apparatus according to an embodiment of the present invention.

FIG. 11 illustrates a propulsion or drive module 33, in accordance with an embodiment of the present invention. As shown, the propulsion module 33 includes two drive wheels 36a-36b and one or two pivoting, rotating or swivel wheels or rollers 37. Each of the two drive wheels 36a-36b is driven by one of two differential battery powered drive motors 51a-51b, respectively. The two-wheel differential steering design exhibits minimal skidding of wheels when turning. Skidding wheels can damage the type of soft surface being traveled over. So, a steering mechanism that minimizes skidding is desirable. The two-wheel differential steering supports turn in place. A feature that is extremely useful for the precise turns required for the purposes of the present invention. With two-wheel differential steering, the steering occurs via the same mechanism as propulsion, avoiding additional steering of specific components. With two-wheel differential steering, there is a separate motor for each drive wheel, obviating the need for the complex drive linkage required when a single engine has to power multiple wheels in an apparatus that requires the two drive wheels to simultaneously have differential rotational rates.

The propulsion or drive module 33 uses differential steering to move the cleaning apparatus 30 precisely down a boundary line keeping the cleaning device 34 in position for cleaning the boundary line, or simply allowing the cleaning apparatus 30 to move to a specific point on the boundary line. The cleaning apparatus 30 is initially placed in the center over the boundary line and oriented down the boundary line. The propulsion module 33 then drives the cleaning apparatus 20 straight along the boundary line by turning both drive wheels 36a-36b at the same time. The rotational rate of each of the drive wheels 36a-36b is dynamically controlled by the amount of drive power delivered to each of the drive wheels 36a-36b. As the cleaning apparatus 30 is moving along the boundary line, the line-sensing module 31 continues to capture images that allow a determination of the displacement of the cleaning apparatus 30 from the center of the boundary line. If the cleaning apparatus 30 begins to veer to the left, for example, the propulsion or drive module 33 then applies slightly more differential power to the left drive wheel 36a than to the right drive wheel 36b, increasing the rotational rate of the left drive wheel 36a relative to the rotational rate of the right drive wheel 36b. Such action causes the path of the cleaning apparatus 30 to curve slightly to the right, thereby correcting its course and keeping the cleaning apparatus 30 precisely on the boundary line being followed. Similar corrective action can be performed on the right drive wheel 36*b* if the cleaning apparatus 30 begins to veer to the right.

As explained previously, the cleaning device 34 can be one of a number of mechanisms for removing debris from a boundary line. The deployment of the cleaning device 34 is under specific program control so that the cleaning device 34 cleans boundary lines as the cleaning apparatus 30 passes over the boundary lines while causing minimal damage of the court areas adjacent to the boundary lines. FIGS. 2-6 illustrate a cleaning device 34 in accordance with an embodiment of the present invention. As shown, the cleaning device 34 includes a cleaning brush 61, a brush height control wheel 62, an electric brush motor 63, a drive train 64, and a brush assembly hoist mechanism 65. The cleaning brush 61 is cylindrical in shape with its axis parallel to the court surface. The width (cylindrical length) of the cleaning brush 61 is slightly wider than a boundary line. During operation, the cleaning brush 61 rotates and is in physical contact with a boundary line being cleaned. The brush height control wheel 62 rolls on the boundary line and the rigidity of the brush assembly hoist mechanism 65 maintains the cleaning brush 61 to be in contact with the boundary line. This allows the cleaning brush 61 to clean the boundary line that is not perfectly flat, level and/or smooth. The brush height control wheel 62 is positioned behind the cleaning brush 61 so as to minimize its interference with the brush operation.

The brush motor 63 rotates the cleaning brush 61 via the drive train 64. When the cleaning brush 61 is performing a cleaning function, the brush motor 63 is turned on; otherwise the brush motor 63 is turned off. The drive train 64 is a chain or belt whose linkage transfers the rotation of the brush motor 63 to the rotation of the cleaning brush 61. The weight of the brush motor 63 is relatively significant; thus, its position can affect the maneuverability and stability of the cleaning apparatus 30. The arrangements as shown in FIGS. 2-6 allow the physical location of the brush motor 63 to be centered across the width of the cleaning apparatus 30. The arrangements also allow the brush motor 63 to be positioned behind the cleaning brush 61 and towards the center of the length of cleaning apparatus 30, enhancing the balance of the cleaning apparatus 30. In contrast to an arrangement in which the shaft of a brush motor in line with the brush cylindrical axis, the arrangement as shown allows the brush motor 63 to be positioned away from the court surface to any degree necessary to eliminate any ground clearance issues for the brush motor 63.

The brush assembly hoist mechanism 65 is an example of the means for lifting the cleaning brush 61 off the court surface. When the cleaning brush 61 is deployed in its cleaning position, the position of the brush assembly (i.e., the cleaning brush 61, the brush motor 63 and the brush height control wheel 62) can move up and down with respect to the drive wheels 36 so that the brush assembly can follow the undulations of the court line (or lack thereof) independently from undulations (or by the lack thereof) being encountered by the drive wheels 36.

In an embodiment of the present invention, the microcontroller 47 (see FIG. 10) controls the operation of the line-sensing module 31, the navigation and control module 32, the propulsion module 33, and the cleaning device 34. A single unified point of control allows the performance of each of the above-mentioned modules to be affected by the state of the rest of the system. For example, the navigation and control module 32 "knows" when the cleaning apparatus 30 is about to reach the end of a boundary line (from knowing its starting point and knowing the distance traveled). When in the vicinity of the end of the boundary line, the navigation and control module 32 infers from a camera image containing no court line that the end of the boundary line has been reached. When the navigation and control module 32 knows the cleaning apparatus 30 to be only part of the way down a boundary line, as opposed to being at the end of a boundary line, and the line-sensing module 31 reports that the current camera image contains no boundary line, then what is inferred is that the cleaning apparatus 30 has failed to follow the boundary line or that the boundary line has become obscured from view, for example. Similarly, when the navigation and control module 32 "knows" that the cleaning apparatus 30 is approaching the end of the boundary line where it will have to stop and turn, then that information causes the control of the propulsion module 33 to decelerate the cleaning apparatus 30 appropriately such that a precise turn can be made. Also, when the navigation and control module 31 "knows" the cleaning apparatus 30 is at the end of a boundary line (because of positioning information and the interpretation of the image provided by the line-sensing module 31), then the drive motor 63 for the cleaning brush 61 is turned off and the cleaning device 34 is raised to a position at which the cleaning device 34 is not in contact with the court surface.

The tennis court 20 can be divided into two half courts, one on each side of the net. The algorithm for cleaning boundary lines involves working the first side of the tennis court 20 and then crosses the net to the second side of the tennis court 20 and essentially repeating the same work that was done in the first side of the tennis court 20 (see, e.g., FIGS. 13-15). For the cleaning apparatus 30 to clean a first half of the tennis court 20, the handle 39 can be used to manually position the cleaning apparatus 30 on the single's sideline 21*a* at the net heading towards the baseline 23*a* as shown in FIG. 1. The rest of the operations are performed automatically by the cleaning apparatus 30. The apparatus 30, for example, can clean along the single's sideline 21*a* from the net towards the baseline 23*a* and stop at the intersection of the sideline 21*a* and the baseline 23*a*. The apparatus rotates right 90 degrees to head towards the double's sideline 22*a*, cleans along the baseline 22*a*, and stops at the double's sideline 22*a*. The apparatus 30 then rotates right 90 degrees to head towards the net. It cleans the double's sideline 22*a* and stops at the net. The apparatus 30 then rotates 180 degrees towards the baseline 23*a*, follows the double's sideline 22*a* from the net, and stops at the baseline 23*a*. The apparatus again rotates left 90 degrees to head towards the single's sideline 21*b*, cleans the baseline 23*a* from the double's sideline 22*a*, and stops at the center mark of baseline 23*a*. The apparatus rotates left 90 degrees to head towards the net, cleans the center mark 26*a* from the baseline 23*a* to the end of the line, backs up to the intersection of the center mark and the baseline 23*a*, and rotates right 90 degrees to head towards the double's sideline 22*b*. The apparatus 30 cleans the baseline 23*a* from the center mark to the double's sideline 22*b* and stops at the sideline 22*b*. The apparatus rotates 180 degrees to head across the baseline 23*a*, follows the baseline 23*a* from the double's sideline 22*b* to the single's sideline 21*b*, and stops at the single's sideline 21*b*. The apparatus 30 once again rotates 90 degrees to the right to head along the single's sideline 21*b*, cleans the single's sideline 21*b* from the baseline 23*a* to the service line 24*a*, and stops at the service line 24*a*. The apparatus then rotates 90 degrees to the left to head along the service line 24*a*.

The apparatus 30 cleans the service line 24a from the single's sideline 21b to the single's sideline 21a and stops at the singles sideline 21a. It rotates 90 degrees to the right to head along the single's sideline 21a toward the net, cleans the single's sideline 21a from the service line to the net and stops, rotates 180 degrees to head away from the net towards the baseline, and follows the single's sideline 21a to the service line and stops. The apparatus 30 then rotates 90 degrees to the left to head across the service line, follows the service line to the center line and stops, rotates 90 degrees to the left to head toward the net, and cleans the center line from the service line to the net and stops. It then rotates 180 degrees to head away from the net toward the service line, follows the center line to the service line and stops, rotates 90 degrees to the left to head along the service line to the single's sideline 21b, and follows the service line to the single's sideline 21b and stops. The apparatus 30 once again rotates 90 degrees to the left to head along the single's sideline 21b toward the net, cleans the single's sideline 21b from the service line to the net and stops, rotates 180 degrees to head away from the net toward the baseline 23a, and follows the single's sideline 21b from the net to the baseline 23a and stops.

The apparatus 30 rotates 90 degrees to the left to head across the baseline 23a towards the double's sideline 22b, follows the baseline to the double's sideline 22b and stops, rotates 90 degrees to the left to head along the double's sideline 22b toward the net, cleans the double's sideline 22b from the baseline 23a to the net and stops. The lines on the first half court are done.

The apparatus now rotates 90 degrees to the right to head parallel to the net outside the court boundaries, moves straight ahead a distance that is just past the net post and stops, rotates 90 degrees to the left to head in a direction parallel to the court sidelines, moves straight a distance that is just past the net post and stops. The apparatus position is now on the second half court. The apparatus 30 rotates 90 degrees to the left to head parallel to the net toward the center of the court, moves straight to the second half court left singles sideline and stops at the left singles sideline. The apparatus 30 rotates 90 degrees to the right to head along the single's sideline 21a towards the baseline.

Figure 13:
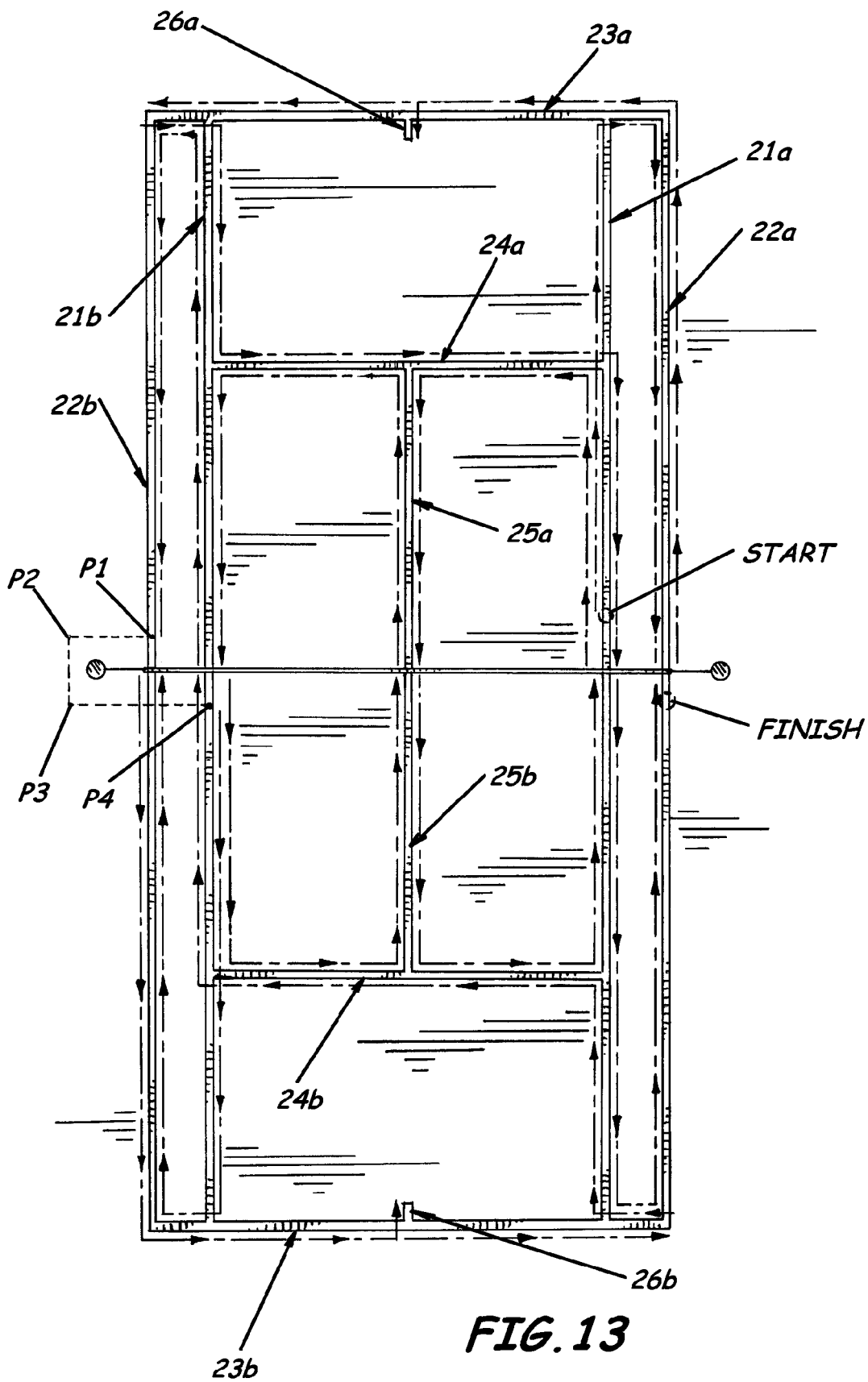
FIG. 13 is a top plan view of a cleaning route on a tennis court, in accordance with an embodiment of the present invention.

For example, there are at least two methods for moving the cleaning apparatus 30 from one side of the net to the other. FIG. 13 depicts points P1, P2, P3 and P4 on the tennis court 20 at which the cleaning apparatus 30 makes a turn to move around a net post. The points P1-P4 are defined for illustration purpose only and have no physical manifestation on the tennis court 20. Point P1 is the end position of the cleaning apparatus 30 after cleaning a first side of the tennis court 20. The cleaning apparatus 30 then moves to the second side of the tennis court 20, as follows.

The apparatus 30 rotates to head towards point P2, moves from point P1 to point P2, rotates to head towards point P3, and moves from point P2 to point P3. The apparatus then rotates to head towards point P4, moves from P3 to point P4, and rotates to head away from the net and towards the baseline 23b.

As the cleaning apparatus 30 approaches point P4, the cleaning apparatus 30 can enable the cleaning brush 34 to expose the single's sideline 21b at point P4 and therefore be able to visually identify when its path intersects the single's sideline 21b. For all of the other parts of the maneuver, the cleaning brush 34 can be turned off. Except for the visual determination of when point P4 is reached, all the movement and navigation for this maneuver around the net can be controlled by odometric techniques.

Figure 14:
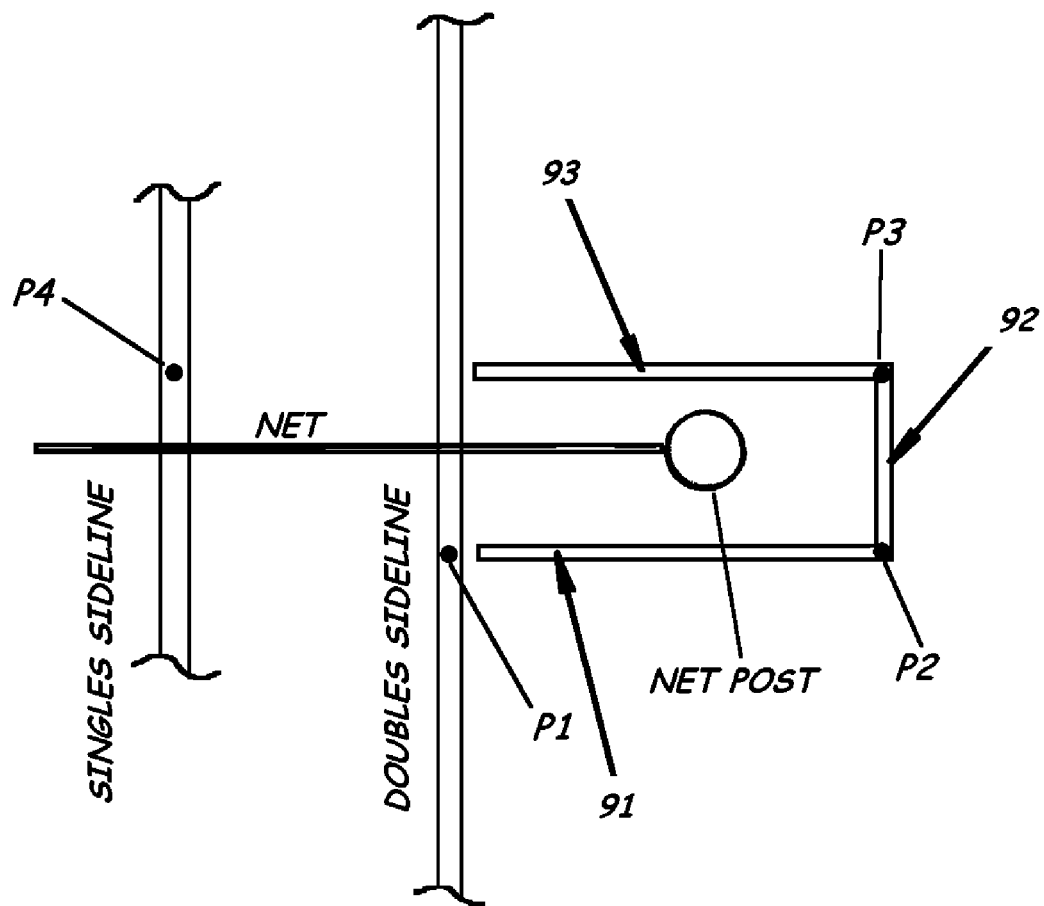
FIG. 14 is a schematic view of a route for a cleaning apparatus to travel around a net post of a tennis court according to the present invention.

Another method requires a modification to the tennis court 20 by adding three tracking guidelines 91-93 around a net post outside the boundary lines of the tennis court 20 as shown in FIG. 14. The tracking guidelines 91-93 are made of the same material as the boundary lines and are held in place in the same manner as the boundary lines. The purpose of the tracking guidelines 91-93 is to serve as a guideline for the cleaning apparatus 30 to follow from one side of the net to the other. The tracking guidelines 91-93 are at defined positions and are of defined length. The steps for the cleaning apparatus 30 to go around the net in this other method are the same as in the first method described, except that tracking guidelines 91-93 are used to guide the cleaning apparatus 30 along. As the cleaning apparatus 30 is traveling from P3 and approaches the double's sideline 22b, the cleaning brush 61 is turned off and the guideline tracking mechanism is disabled, and odometric techniques are used to navigate the cleaning apparatus 30 through the rest of the way to point P4.

With the first method described, precision errors accumulate from point P1 all the way to point P4 so that the total precision error when point P4 is reached may be significant, which can limit the ability of the cleaning apparatus 30 to locate point P4. With the second method described, there is no accumulation of precision error so the position error at point P4 is only a precision error that is incurred in moving from just before the double's sideline 22b to point P4, which should be a relatively insignificant amount of error. The second method described requires some modification to the tennis court 20, albeit outside the boundaries of play, but the first method described works on any regulation tennis court without any modification at all.

Figure 15:
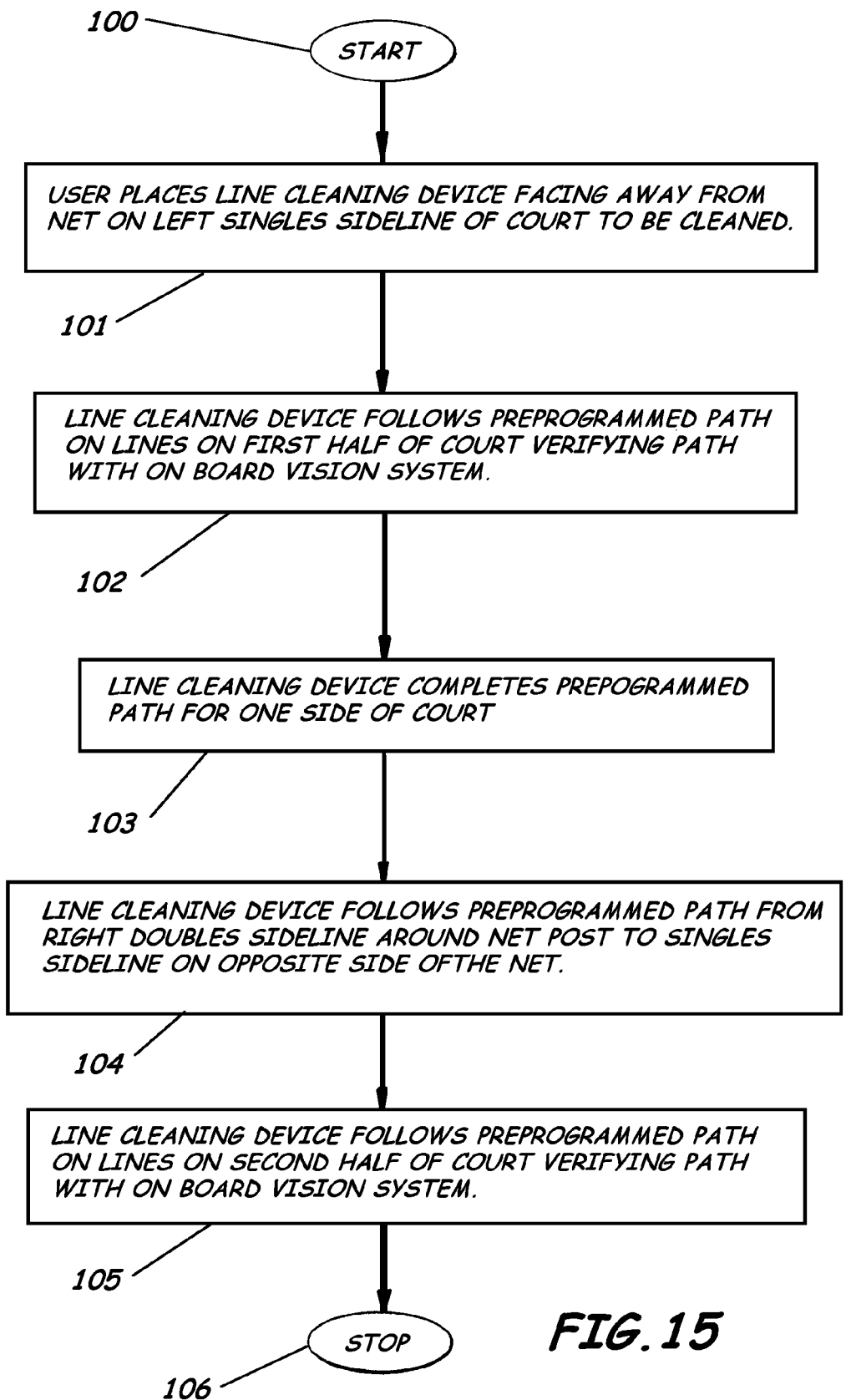
FIG. 15 is a flow chart of operation of a cleaning apparatus for traveling around a net post of a tennis court according to the present invention.

FIG. 15 is a flowchart illustrating a method for cleaning boundary lines on a playing surface of a tennis court, in accordance with an embodiment of the present invention. Starting at block 100, a user places the cleaning apparatus 30 facing away from the net on the single's sideline 21a of the tennis court 20 to be cleaned, as shown in block 101. The cleaning apparatus 20 follows a preprogrammed path on the boundary lines on the first half of the tennis court 20, as depicted in block 102. The cleaning apparatus 30 completes preprogrammed path for one side of the court, as shown in block 103. The cleaning apparatus 30 then follows a preprogrammed path from the double's sideline 22b around the net post to single's sideline on the opposite side of the net, as depicted in block 104. The cleaning apparatus 30 follows a preprogrammed path on the boundary lines on the second half of the tennis court 20, verifying the path with the on-board line-sensing module, as shown in block 105. When cleaning is complete, the cleaning apparatus stops as shown in block 106.

Figure 16:
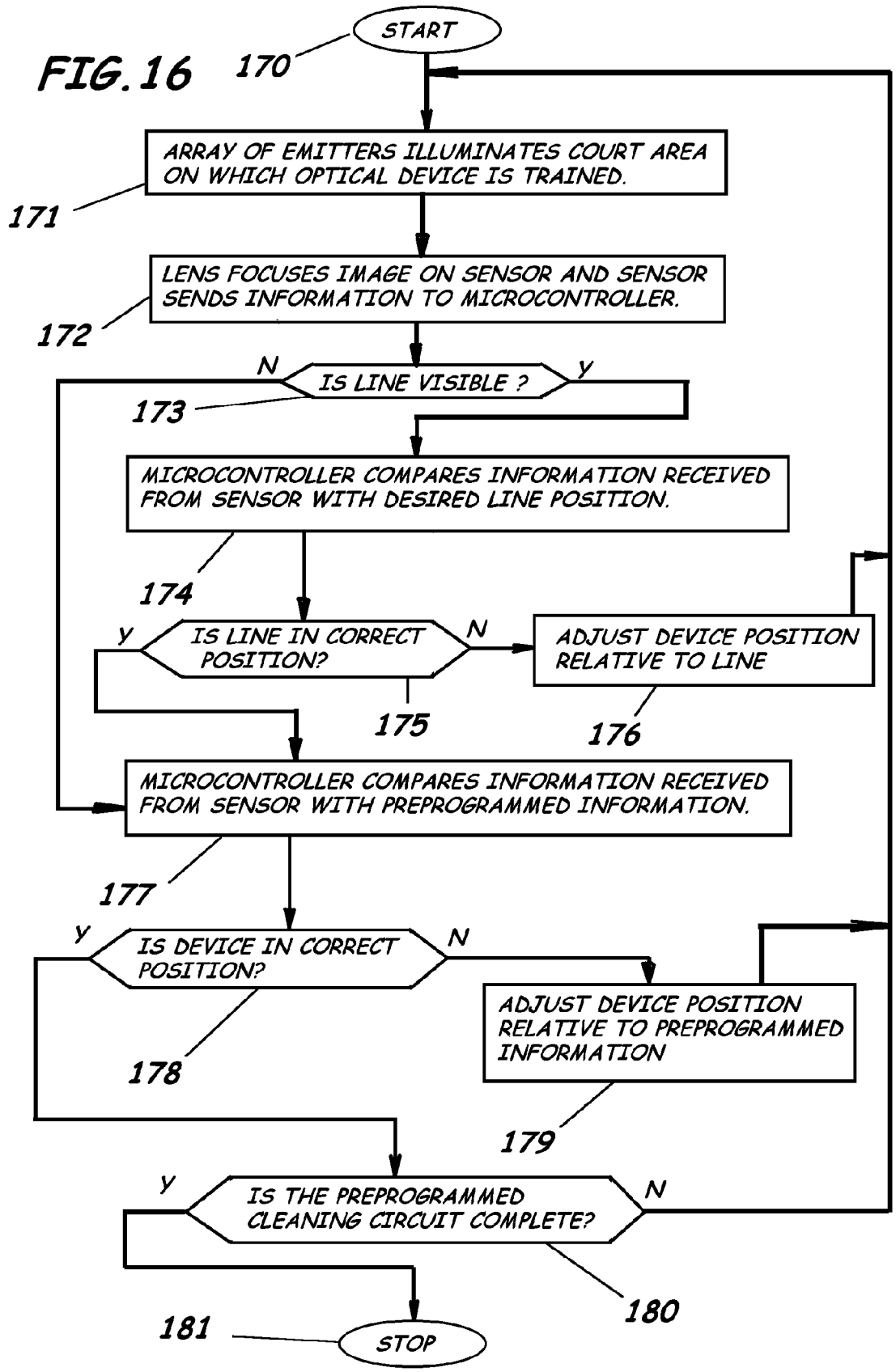
FIG. 16 is a flowchart illustrating operation of a cleaning apparatus and associated software and methods according to an embodiment of the present invention.

FIG. 16 is a flowchart illustrating the operations of the cleaning apparatus 30 for cleaning boundary lines on a playing surface of a tennis court, in accordance with an embodiment of the present invention. Starting with block 170, an array of emitters illuminates the court area on which an optical sensing device is trained, as shown in block 171. The lens focuses image on the sensor and the sensor sends information to a microcontroller, as show in block 172. A determination is made as to whether or not a line is visible, as shown in block 173. If the line is visible, the microcontroller compares information received from sensor with the desired line position, as depicted in block 174. Another determination is made as to whether or not the line is in a correct position, as shown in block 175. If the line is not in the correct position, the position of the cleaning apparatus is adjusted relative to the line, as depicted in block 176.

Otherwise, if the line is in the correct position, the microcontroller compares the information received from the sensor with the preprogrammed information, as shown in block 177.

Next, a determination is made as to whether or not the cleaning apparatus is in the correct position, as shown in block 178. If the cleaning apparatus is not in the correct position, the position of the cleaning apparatus is adjusted relative to the preprogrammed information, as depicted in block 179. Another determination is made as to whether or not the preprogrammed cleaning circuit has been completed, as shown in block 180. If the preprogrammed cleaning circuit has not been completed, the process returns to block 171. Otherwise, the process exits at block 181.

Figure 12:
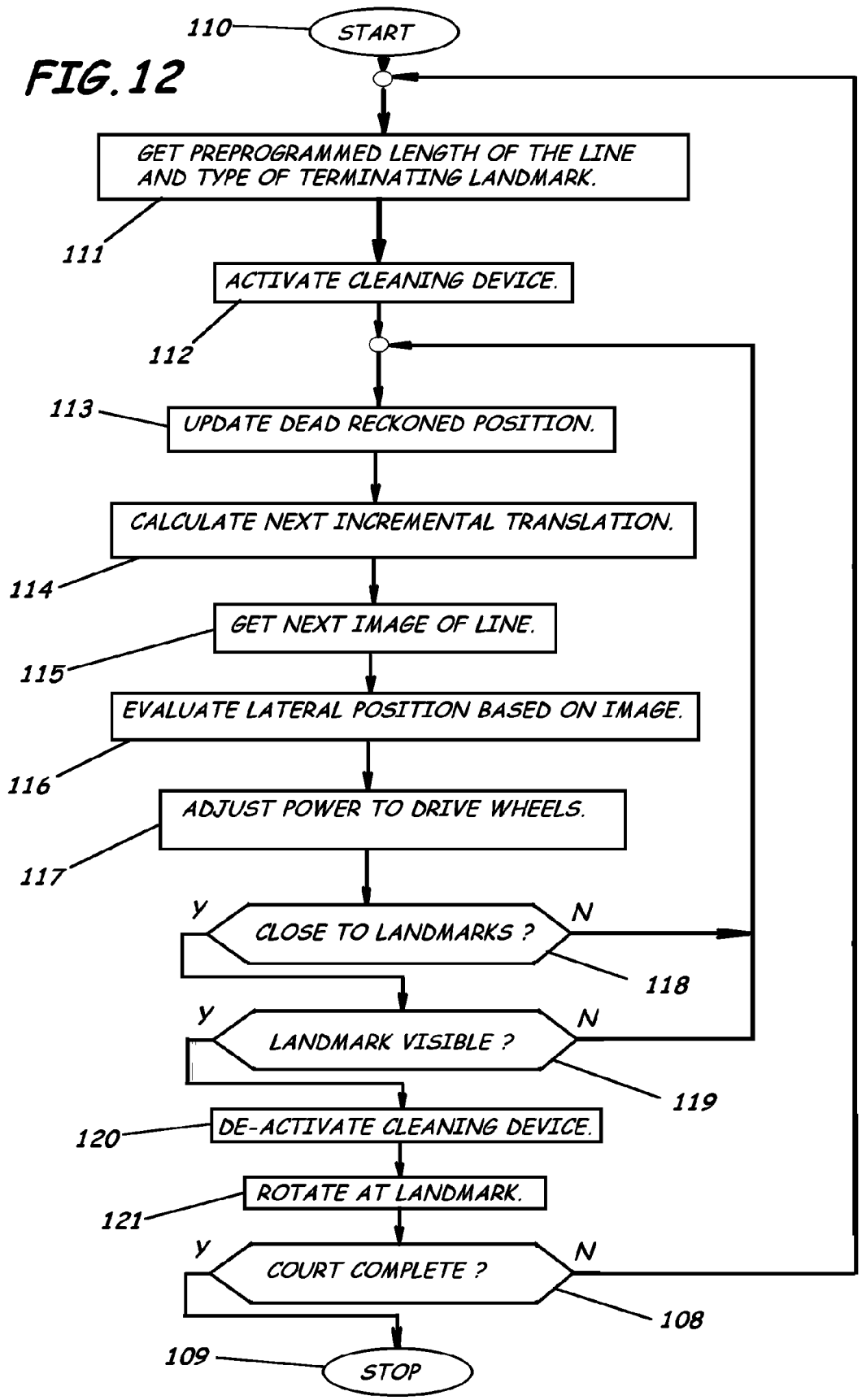
FIG. 12 is a flowchart illustrating operation of a cleaning apparatus and associated software and methods according to an embodiment of the present invention.

FIG. 12 is a flowchart illustrating the operation of the cleaning apparatus 30 for cleaning boundary lines on a playing surface of a tennis court, in accordance with an embodiment of the present invention. Starting with block 110, a microcontroller can get a preprogrammed length of a line to be cleaned and type of terminating landmark, as shown in block 111. The cleaning device 34 can then be activated, as shown in block 112, When the cleaning device 34 is active, a dead reckoned position can be updated, as shown in block 113, and a next incremental translation can be calculated, as shown in block 114. The microcontroller can get a next image of the line, as shown in block 115, to evaluate a lateral position of the cleaning apparatus 30 based on the image, as shown in block 116. Power can be adjusted to the drive wheels 36, as shown in block 117. Next, a determination is made as to whether or not the cleaning apparatus 30 is close to the terminating landmark, as shown in block 118. If not, the process return to block 113, otherwise a determination is made whether the terminating landmark is visible, as shown in block 119. If not visible, the process returns to block 113, otherwise the cleaning device 34, is deactivated, as shown in block 120, and the cleaning apparatus 30 is rotated at the landmark, as shown in block 121. Next, a determination is made whether all lines of the tennis court are cleaned, as shown in block 108. If not complete, the process returns to block 111, otherwise, the process exits at block 109.

As illustrated in FIGS. 1-16, and as described above, the present invention also includes various methods of cleaning at least one line of a surface. A method for cleaning boundary lines on a game playing surface, for example, includes positioning a cleaning device on or near a game playing surface, directing a cleaning device to move along boundary lines on a game playing surface responsive to a set of programmed directions and cleaning the boundary lines when the cleaning device is moving along the boundary lines. The method can also include the directing step having a step of determining a current position of the cleaning device by using a known initial position and an orientation of the cleaning device on the game playing surface and can use wheel dimensions and rotation data and a predetermined length of each boundary line. The game playing surface can advantageously be a surface of a tennis court, and more advantageously a clay surface of a tennis court, and the method can further include adding a plurality of tracking guidelines situated around a net post of the game playing surface for guiding the cleaning device to move around the net post. The method can still further include sensing a location of a boundary line of a tennis court.

Another method for cleaning boundary lines on a game playing surface can include directing a cleaning device to move along boundary lines on a game playing surface responsive to a set of programmed directions and selectively positioning a cleaning tool on a boundary line to clean the boundary line as the cleaning device is moving over the boundary line. The method can also include the directing step having a step of determining a current position of the cleaning device by using a known initial position and an orientation of the cleaning device on the game playing surface. The method can also include determining step further using wheel dimensions and rotation data and a predetermined length of each boundary line. The game playing surface preferably is a surface of a tennis court, and the method further can include adding a plurality of tracking guidelines situated around a net post of the game playing surface for guiding the cleaning device to move around the net post. The method can also include sensing a location of a boundary line of a tennis court.

Yet another method for cleaning boundary lines on a game playing surface, which includes a first playing surface and a second playing surface separated from each other by a net connected between a plurality of posts, can include directing a cleaning device to move along boundary lines on the first playing surface responsive to a set of programmed directions, cleaning the boundary lines on the first playing surface as the cleaning device is moving over the boundary lines on the first playing surface, directing the cleaning device to move around one of the net posts to position the cleaning device on the second playing surface, and cleaning the boundary lines on the second playing surface as the cleaning device is moving over the boundary lines on the second playing surface. The directing step can include a step of determining a current position of the cleaning device by using a known initial position and an orientation of the cleaning device on the game playing surface. The determining step can further use wheel dimensions and rotation data and a predetermined length of each boundary line. The game playing surface is preferably a surface of a tennis court, and the method can further include adding a plurality of tracking guidelines situated around a net post of the game playing surface for guiding the cleaning device to move around the net post. The method can further include sensing a location of or presence of a boundary line of the game playing surface.

The present invention, as described and illustrated, also includes software or a computer program product residing on a computer usable medium for directing a cleaning device to clean at least one line on a surface. As described herein and understood by those skilled in the art, the code means is preferably software or computer program code or language as understood by those skilled in the art. A computer program product program code means for directing a cleaning device to move along at least one line of a surface and program code means for cleaning the at least one line on the surface when the cleaning device is moving along the at least one line. The program code means for directing can further include program code means for determining a current position of the cleaning device by using a known initial position and an orientation of the cleaning device on the surface. The program code means for determining further uses wheel dimensions and rotation data and a predetermined length of each line. The surface can advantageously be a surface of a tennis court.

Another computer program product for cleaning boundary lines on a game playing surface according to the present invention can include program code means for directing a cleaning device to move along boundary lines on a game playing surface responsive to a set of programmed directions and program code means for selectively positioning a cleaning tool on a boundary line to clean the boundary line as the cleaning device is moving over the boundary line. The program code means for directing step can further include program code means for determining a current position of the cleaning device by using a known initial position and an orientation of the cleaning device on the game playing surface. The program code means for determining can further use wheel dimensions and rotation data and a predetermined length of each boundary line. The game playing surface can advantageously be a surface of a tennis court.

Still another computer program product for cleaning boundary lines on a game playing surface, which the game playing surface includes a first playing surface and a second playing surface separated from each other by a net connected between a plurality of posts, can include program code means for directing a cleaning device to move along boundary lines on the first playing surface responsive to a set of programmed directions, program code means for cleaning the boundary lines on the first playing surface as the cleaning device is moving over the boundary lines on the first playing surface, program code means for directing the cleaning device to move around one of the net posts to position the cleaning device on the second playing surface, and program code means for cleaning the boundary lines on the second playing surface as the cleaning device is moving over the boundary lines on the second playing surface. The program code means for directing can further include program code means for determining a current position of the cleaning device by using a known initial position and an orientation of the cleaning device on the game playing surface. The program code means for determining also can further use wheel dimensions and rotation data and a predetermined length of each boundary line as understood by those skilled in the art. The game playing surface advantageously can be a surface of a tennis court as illustrated and described.

As has been described, the present invention provides an apparatus for cleaning boundary lines on a playing surface of a tennis court. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks, CD ROMs, various programmable and re-writable ROMs, and transmission type media such as analog or digital communications links.

Although the invention has been particularly shown and described with reference to illustrated preferred embodiments, it will be understood by those skilled in the art that various changes in form and detail may be made therein without departing from the spirit and scope of the invention.

That claimed is:

1. A method for cleaning boundary lines on a game playing surface, the method comprising:
   providing a handle for positioning a cleaning device on or near a game playing surface;
   a controller directing a cleaning device to move along boundary lines on a game playing surface responsive to a set of programmed directions;
   cleaning the boundary lines without cleaning substantial portions of the game playing surface when the cleaning device is moving along the boundary lines; and
   sensing a location of a boundary line of a tennis court.

2. A method as defined in claim 1, wherein the directing step further includes a step of determining a current position of the cleaning device by using a known initial position and an orientation of the cleaning device on the game playing surface.

3. A method as defined in claim 2, wherein the determining step further uses wheel dimensions and rotation data and a predetermined length of each boundary line.

4. A method as defined in claim 1, wherein the game playing surface comprises a surface of a tennis court, and the method further comprises adding a plurality of tracking guidelines situated around a net post of the game playing surface for guiding the cleaning device to move around the net post.

5. A method as defined in claim 4, wherein the directing step further includes a step of determining a current position of the cleaning device by using a known initial position and an orientation of the cleaning device on the game playing surface.

6. A method as defined in claim 5, wherein the determining step further uses wheel dimensions and rotation data and a predetermined length of each boundary line.

7. A method for cleaning boundary lines on a game playing surface, the method comprising:
   providing a handle for positioning a cleaning device on or near a game playing surface;
   a controller directing a cleaning device to move along boundary lines on a game playing surface responsive to a set of programmed directions;
   cleaning the boundary lines without cleaning substantial portions of the game playing surface when the cleaning device is moving along the boundary lines; and
   the directing step further includes a step of determining a current position of the cleaning device by using a known initial position and an orientation of the cleaning device on the game playing surface.

8. A method as defined in claim 7, wherein the determining step further uses wheel dimensions and rotation data and a predetermined length of each boundary line.

9. A method as defined in claim 7, wherein the game playing surface comprises a surface of a tennis court, and the method further comprises adding a plurality of tracking guidelines situated around a net post of the game playing surface for guiding the cleaning device to move around the net post.

10. A method as defined in claim 9, wherein the determining step further uses wheel dimensions and rotation data and a predetermined length of each boundary line.

11. A method for cleaning boundary lines on a game playing surface, the method comprising:
    providing a handle for positioning a cleaning device on or near a game playing surface;
    a controller directing a cleaning device to move along boundary lines on a game playing surface responsive to a set of programmed directions;
    cleaning the boundary lines without cleaning substantial portions of the game playing surface when the cleaning device is moving along the boundary lines; and
    wherein the game playing surface comprises a surface of a tennis court, and the method further comprises adding a plurality of tracking guidelines situated around a net post of the game playing surface for guiding the cleaning device to move around the net post.

* * * * *